(12) United States Patent
Hagg et al.

(10) Patent No.: US 6,666,070 B1
(45) Date of Patent: Dec. 23, 2003

(54) METHOD FOR TESTING THE INTEGRITY OF DPFS

(75) Inventors: Ralph H. Hagg, Corning, NY (US); Jeffrey G. Payne, Painted Post, NY (US); Leon R. Zoeller, III, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/184,316

(22) Filed: Jun. 26, 2002

(51) Int. Cl.[7] .................. G01M 3/04; G01M 3/24; G01N 15/08; B01D 46/00

(52) U.S. Cl. .................. 73/38; 73/40; 73/40.5 A; 73/49.7; 55/523; 95/273; 96/414; 96/417; 96/419

(58) Field of Search .................. 73/38, 40, 40.5 A, 73/49.7; 55/523, DIG. 30; 95/414, 417, 419

(56) References Cited

U.S. PATENT DOCUMENTS

| | | | | |
|---|---|---|---|---|
| 4,293,357 A | * | 10/1981 | Higuchi et al. | ............... 55/523 |
| 4,676,092 A | * | 6/1987 | Tuttle | ............................ 73/38 |
| 4,857,089 A | * | 8/1989 | Kitagawa et al. | ............. 55/523 |
| 5,102,434 A | * | 4/1992 | Hijikata et al. | ................ 73/38 |
| 5,398,541 A | * | 3/1995 | Hijikata et al. | ................ 73/38 |

\* cited by examiner

Primary Examiner—Daniel S. Larkin
(74) Attorney, Agent, or Firm—Anca C. Gheorghiu

(57) ABSTRACT

A method for inspecting the integrity of diesel exhaust filter by introducing air under pressure through one end of the structure and detecting the presence of air flow at an opposing end surface. The diesel exhaust filter is tested green.

14 Claims, 3 Drawing Sheets

METHOD FOR TESTING THE INTEGRITY OF DPFS

BACKGROUND OF INVENTION

The instant invention relates to filters for the removal of particulate material from diesel engine exhaust, and more particularly to a method of testing the integrity of diesel particulate filters (DPFs) for detecting defects which affect the filtration efficiency.

Wall-flow diesel particulate filters are used in the purification of diesel exhaust. Typically such diesel particulate filters are made of cordierite (U.S. Pat. No. 4,420,316) or silicon carbide (U.S. Pat. No. 5,914,187), and include a honeycomb body having thin interconnecting interior porous walls which form parallel cell channels of equal hydraulic diameter, longitudinally extending between the end faces of the structure. Alternating cells on one end face of the honeycomb are plugged with a ceramic filler material to form a "checkerboard" pattern. The pattern is reversed on the opposite side, so that the ends of each cell are blocked at only one end of the structure. When diesel exhaust enters the filter through one end face (i.e., inlet end), it is forced to pass through the porous walls in order to exit through the opposite end face (i.e., outlet end).

For diesel particulate filtration, honeycomb structures having cellular densities between about 10 and 300 cells/in$^2$ (about 1.5 to 46.5 cells/cm$^2$), more typically between about 100 and 200 cells/in$^2$ (about 15.5 to 31 cells/cm$^2$), are considered useful to provide sufficient thin wall surface area in a compact structure. Wall thickness can vary upwards from the minimum dimension providing structural integrity of about 0.002 in. (about 0.05 mm.), but are generally less than about 0.060 in. (1.5 mm.) to minimize filter volume. A range of between about 0.010 and 0.030 inches (about 0.25 and 0.76 mm.) e.g., 0.019 inches, is most often selected for these materials at the preferred cellular densities.

Filtration efficiencies up to and in excess of 90% of the diesel exhaust particulates (by weight) can be achieved with the described structures. However, the filtration efficiency or integrity of DPFs can be compromised by defects from the manufacturing process, such as breaks or holes in the interior cell walls. Such defects allow diesel exhaust containing soot particulates to pass through the structure with no filtration.

Methods of inspecting internal defects affecting described diesel filters are known in the art. U.S. Pat. No. 5,102,434 to Hijikata et al. is directed to a method in which a gas containing particulates, such as carbon soot, is flowed through one end of the filter, exiting the opposing end adjacent a gas-permeable screen. The carbon soot or other particulates employed will escape through leaks or defects in the interior walls to adjacent open cells eventually being captured onto the screen. The screen is then inspected for patterns differing from the defect-free structure.

In another method a clear film is taped to one end of the honeycomb structure and graphite is then blown through the opposite end. The structure is rotated several times. Leaking cells are detected by the presence of graphite on the clear film.

There are several disadvantages associated with these prior art methods. Particularly, both methods required a fired plugged part. It is more costly to repair defect cell channels in the final product, then, for example, while the structure is still green (i.e., has not been fired). Further, in some instances leaking cells are never detected due to what is believed to be bridging of the particulates (i.e., particulates are too big to flow through small cracks). Therefore, there continues to be a need for more reliable and efficient methods of testing the integrity of diesel particulate filters.

BRIEF SUMMARY OF THE INVENTION

The present invention overcomes the above problems and drawbacks by providing a more reliable and efficient method for detecting the presence of integrity leakage defects in ceramic filters for trapping and combusting diesel exhaust particulates. The term "integrity leakage defects" used in the description of the present invention refers to any breaks, tears, holes and the like in the interior walls or at joining sections of the filter body.

In particular, the invention provides a method for testing comprising providing a green plugged honeycomb structure having a plurality of parallel cell channels traversing the structure from an inlet end to an outlet end thereof; passing air under pressure through the inlet end of the honeycomb structure; and detecting airflow at the outlet end of the honeycomb structure, whereby the presence of the air at the outlet end indicates integrity leakage defects in the ceramic filter. The term "green filter" as used in the description of the present invention refers to a structure which has not undergone firing. A green filter has no porosity such that the air cannot pass through the internal walls, unless there is an integrity leakage defect thereat.

The invention is also related to an assembly for testing the integrity of diesel exhaust filters, comprising an enclosure having an aperture; a green plugged filter removably mounted in the aperture of the enclosure; an air blower in communication with the enclosure; and means for detecting air leakage in the green plugged filter.

Therefore, in the present inventive method, in the case where there are no integrity leakage defects in the filter body, airflow will not be present at the end surface opposing the end where air is introduced in the structure. Conversely, in the case where there are integrity leakage defects in the filter body, airflow will be present at the end surface opposing the end where air is introduced in the structure. This is because the air will pass through the defects into adjoining open cell channels to flow out of the structure. By detecting the presence of airflow at an end surface, the number and location of integrity leakage defects in the filter body is determined.

BRIEF DESCRIPTION OF THE DRAWINGS

The invention may be further understood by reference to the following drawings, in which.

DETAILED DESCRIPTION OF THE PREFERRED EMBODIMENTS

Figure 1:
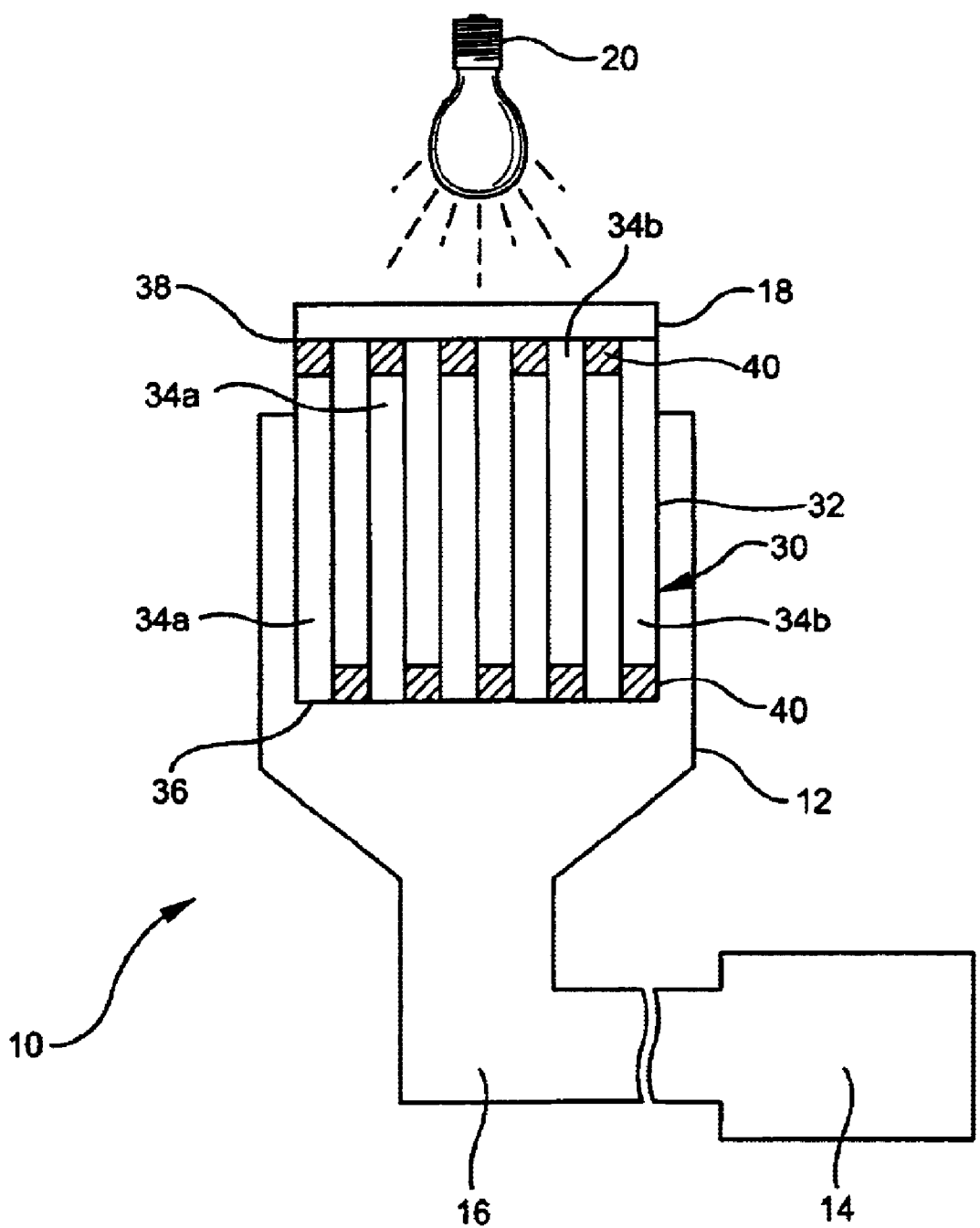
FIG. 1 is a schematic, cross-sectional view of an embodiment of an inventive apparatus for testing the integrity of diesel exhaust particulate filters, the apparatus including a heat sensitive covering secured to the outlet end of a honeycomb filter body.

Referring to FIG. 1 therein depicted is a cross-sectional view of an apparatus 10 including an enclosure 12 connected to air blower 14 at feed pipe 16. A suitable air blower 14 is available as Model Number VB-004B -000(¾ HP) from Spencer Turbine Company (Hartford, Conn.). Enclosure 12 houses a green filter 30 having a honeycomb structure body 32 composed of a ceramic material and a plurality of parallel end-plugged cell channels 34a, 34b traversing the body 32 from an inlet end 36 to an outlet end 38 thereof. Cell channels 34a, 34b are preferably plugged in a checkered pattern such that every other cell channel 34a, 34b has a plug 40 only at one of the inlet end 36 or outlet end 38. Green filter 30 is preferably made of a material which upon being subjected to firing in a furnace undergoes transformation to substantially a cordierite phase, as known in the art.

Green filter 30 is removably mounted in enclosure 12 with inlet end 36 downwardly. Consequently, outlet end 38 of honeycomb body 32 faces upward and out of enclosure 12. Although suitable for filters of any geometry, the present invention is particularly useful for detection of integrity leakage defects for structures having a cell density of 200 cpsi (cells per square inch) and higher.

A heat sensitive covering 18 is secured over the outlet end 38 with, for example, an adhesive tape. A preferred heat sensitive covering, in the practice of the present invention, is a temperature sensitive liquid crystal film available from Edmund Industrial Optics (Barrington, N.J.). The heat sensitive covering 18 is heated by a heat source 20, preferably a 120 W lamp, to a temperature of about 25–30° C. In this way when the air which is at room temperature (i.e., about 22° C.) exits the cell channels 34b which are open at outlet end 38 and strikes the heated covering 18, an imprint or mark is formed indicating a temperature change thereat.

Although the heat sensitive covering 18 is shown to be in direct contact with outlet end 38, it is envisioned that the heat sensitive covering 18 may be positioned in close proximity but not in direct contact with outlet end 38, and still be suitable to function.

Heat source 20 is adjacent heat sensitive covering 18, at a distance of about 10 in. to 15 in. therefrom, preferably at 13 in.

Air having a pressure of about 1 to 15 psi (pounds per square inch) passes from air blower 14 through feed pipe 16 to enclosure 12 and into honeycomb filter body 32 through open cell channels 34a at inlet end 36. It has been found that at higher air pressures, smaller leakage defects can be detected. Therefore, preferably the air pressure is maintained at about 10 to 15 psi.

Figure 2:
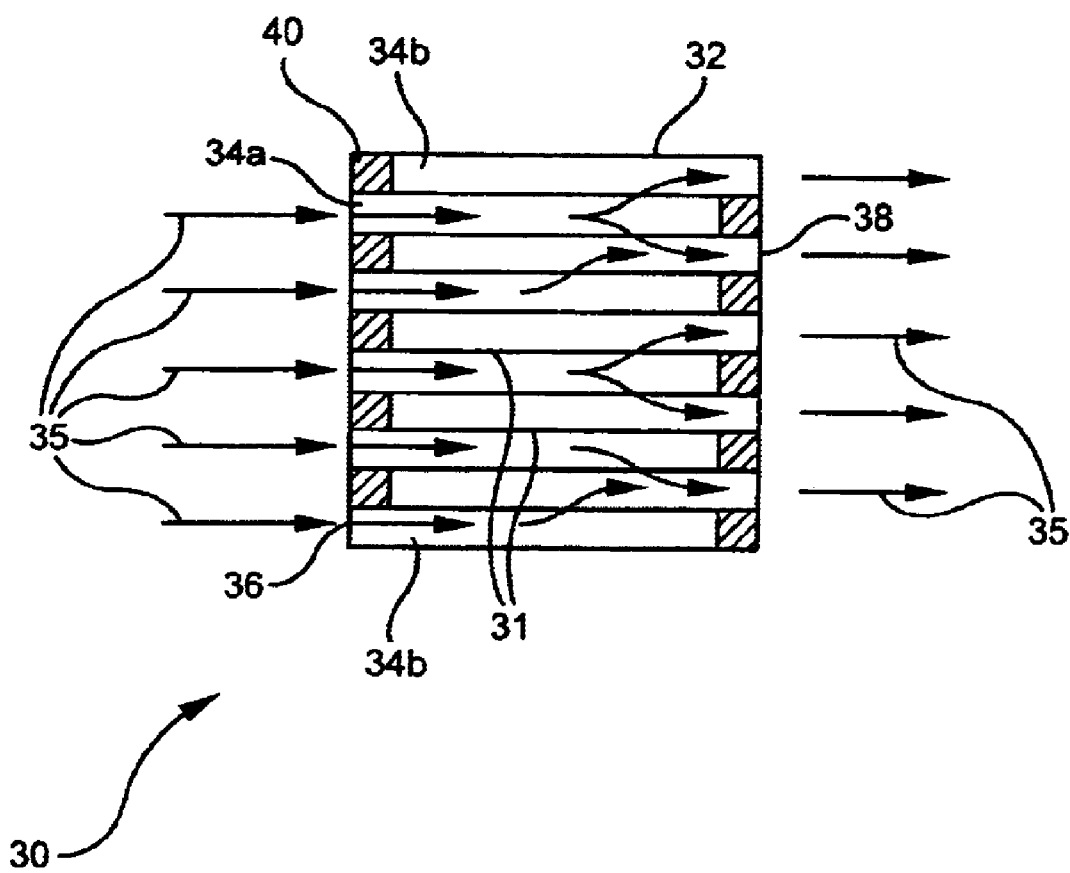
FIG. 2 illustrates the movement of air through integrity leakage defects in a honeycomb filter body; and, FIG. 3 is a schematic, cross-sectional view of another embodiment of an inventive apparatus for testing the integrity of diesel exhaust particulate filter, the apparatus including an acoustic sensor for detecting the sound emitted by airflow at the outlet end of a honeycomb filter body.

Referring now to FIG. 2, in the case where integrity leakage defects 31 exist in the green filter honeycomb body 32, the air represented by arrows 35 will move through these defects 31 from the cell channels 34a which are open at inlet end 36 into neighboring cell channels 34b which are open at outlet end 38 to exit the honeycomb structure 32 thereat. Once exited, the air strikes the heat sensitive covering 18 leaving a figure of imprints thereat. As previously described the imprints are a result of a temperature change, i.e., the room temperature air impacting the warm heat sensitive covering. The heat sensitive covering 18 is then analyzed to look for these imprints, and determine therefrom the number and location of integrity leakage defects in the structure. Typically, the size of the imprints can be correlated to the size of the integrity leakage defect. Accordingly, it is envisioned that a size profile may be generated from multiple runs at various air pressures, i.e., the air pressure is varied incrementally and successive sets of imprints are generated.

It is also envisioned that the steps of inspecting the heat sensitive covering and detecting integrity leakage defects will be automated for increased efficiency with an image analyzer as known in the art. Specifically, the image analyzer which generally consists of a television camera or another optical device would be first used to scan the outlet end of the honeycomb structure and generate a first set of signals indicating the location of the cell channels. Then, the heat sensitive covering would be scanned to generated a second set of signals indicating the location of any imprints. From these two sets of data, a microprocessor (i.e., a personal computer) is then used to associate the location of the imprints with the location of the corresponding cell channels containing the integrity leakage defects.

Figure 3:
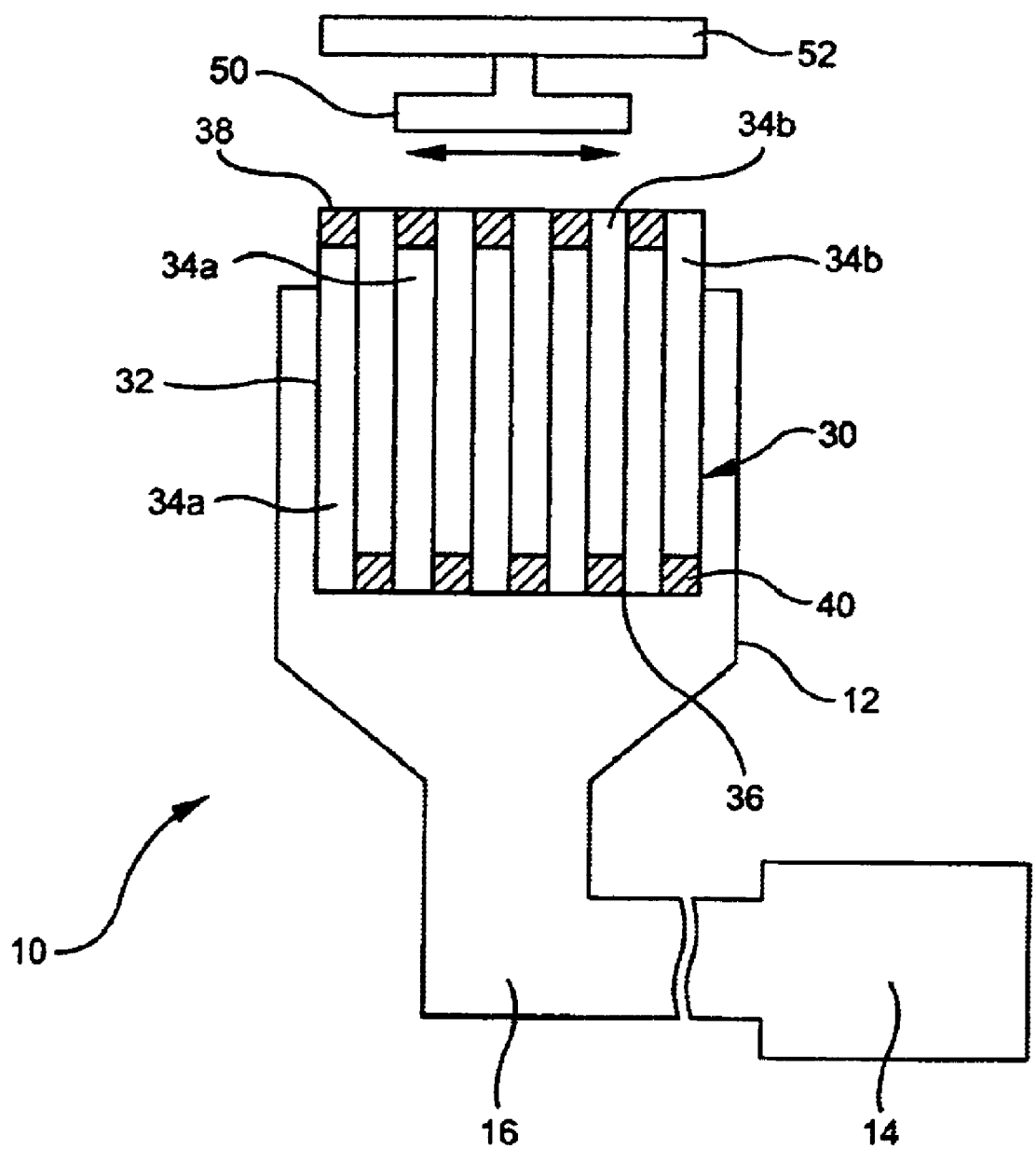

It is still further envisioned, that airflow at the outlet end may also be detected with an acoustic sensor which operates to sense the sound emitted by air exiting open cell channels thereat. A schematic of this embodiment is shown in FIG. 3. Acoustic sensor 50 is secured to jig means 52 for positioning and operation. A suitable acoustic sensor for the purposes of the present invention is AccuTrak VPE-1000, manufactured by Superior Signal Company (Spotswood, N.J.). In the practice of the present invention, acoustic sensor 50 is scanned across the outlet end of the honeycomb structure in the direction of the arrow. A set of signals are recorded and a noise profile is generated on a microprocessor as known in the art. The noise profile is then analyzed to determine the number and location of integrity leakage defects in the structure.

While particular embodiments of the present invention have been shown and described and some modifications suggested, it will be appreciated that other modifications of the invention, not specifically mentioned, will occur to those skilled in the art and are intended to be included within the scope of the appended claims.

What is claimed:

1. A method for detecting integrity leakage defects in a filter for trapping and combusting diesel exhaust particulates, comprising:
   a. providing a green plugged honeycomb structure having a plurality of parallel cell channels traversing the structure from an inlet end to an outlet end thereof;
   b. passing air under pressure through the inlet end of the honeycomb structure; and
   c. detecting airflow at the outlet end of the honeycomb structure, whereby the presence of the air at the outlet end indicates integrity leakage defects in the filter for trapping and combusting diesel exhaust particulates.

2. The method of claim 1 wherein in step c) the detecting of air leakage at the outlet end of the honeycomb structure, further comprises:
   a. securing a heat sensitive covering to the outlet end of honeycomb structure;
   b. applying heat to the heat sensitive covering; and
   c. inspecting the heat sensitive covering for temperature changes to determine the presence of integrity defects in the ceramic filter.

3. The method of claim 2 wherein the heat sensitive covering is a temperature sensitive liquid crystal film.

4. The method of claim 1 wherein in step c) the detecting of air leakage at the outlet end of the honeycomb structure, further comprises:
   a. scanning the outlet end with an acoustic sensor; and
   b. generating a noise profile to determine the presence of integrity defects in the ceramic filter.

5. The method of claim 1 wherein in step b) the air is flown through the green plugged honeycomb structure at a pressure of 1 psi to 15 psi.

6. The method of claim 5 wherein the air is at room temperature.

7. An assembly for testing the integrity of diesel exhaust filters, comprising:
- an enclosure having an aperture;
- a green plugged filter removably mounted in the aperture of the enclosure;
- an air blower in communication with the enclosure; and
- means for detecting air leakage in the green plugged filter.

8. The assembly of claim 7 wherein the green plugged filter comprises a wall-flow honeycomb filter body composed of a ceramic material and having a plurality of parallel cell channels traversing the body from an inlet end to an outlet end thereof, the cell channels having plugged ends.

9. The assembly of claim 8 wherein the cell channels are plugged in a checkered pattern.

10. The assembly of claim 8 wherein the ceramic material is cordierite.

11. The assembly of claim 7 wherein the air blower is in communication with the enclosure through a feed pipe connected therebetween.

12. The assembly of claim 7 wherein the means for detecting air leakage are selected from the group consisting of a heat sensitive covering and an acoustic sensor.

13. The assembly of claim 12 wherein the means for detecting air leakage is a heat sensitive covering.

14. The assembly of claim 13 wherein the heat sensitive covering is a temperature sensitive liquid crystal film.

* * * * *